S. D. LELAND.
MILLING MACHINE.
APPLICATION FILED JULY 28, 1902.

979,972.

Patented Dec. 27, 1910.
6 SHEETS—SHEET 1.

Fig. 1.

Witnesses:
Fred S. Greenleaf.
W. C. Linsford.

Inventor
Sanford D. Leland,
by Crosby & Gregory.
Attys.

S. D. LELAND.
MILLING MACHINE.
APPLICATION FILED JULY 28, 1902.

979,972.

Patented Dec. 27, 1910.
6 SHEETS—SHEET 3.

Fig. 3.

Witnesses:
Fred S. Greenleaf.
W. C. Lunsford.

Inventor,
Sanford D. Leland,
by Crosby Gregory
attys

S. D. LELAND.
MILLING MACHINE.
APPLICATION FILED JULY 28, 1902.

979,972.

Patented Dec. 27, 1910.
6 SHEETS—SHEET 4.

S. D. LELAND.
MILLING MACHINE.
APPLICATION FILED JULY 28, 1902.

979,972.

Patented Dec. 27, 1910.

S. D. LELAND.
MILLING MACHINE.
APPLICATION FILED JULY 28, 1902.

979,972.

Patented Dec. 27, 1910.
6 SHEETS—SHEET 6.

Witnesses:
Fred S. Greenleaf
W. C. Lunsford

Inventor,
Sanford D. Leland,
by Dooley Gregory
attys.

UNITED STATES PATENT OFFICE.

SANFORD D. LELAND, OF WINCHESTER, MASSACHUSETTS, ASSIGNOR TO UNITED SHOE MACHINERY COMPANY, OF PATERSON, NEW JERSEY, AND BOSTON, MASSACHUSETTS, A CORPORATION OF NEW JERSEY.

MILLING-MACHINE.

979,972.     Specification of Letters Patent.     Patented Dec. 27, 1910.

Application filed July 28, 1902. Serial No. 117,228.

*To all whom it may concern:*

Be it known that I, SANFORD D. LELAND, a citizen of the United States, residing at Winchester, in the county of Middlesex and State of Massachusetts, have invented an Improvement in Milling-Machines, of which the following description, in connection with the accompanying drawings, is a specification, like letters on the drawings representing like parts.

This invention has for its object the production of a novel milling machine adapted to produce awls used in shoe machines, and other articles, presenting at one end a milled portion other than round, the cross section of the milled portion varying according to the article being made and the special configuration required in the article.

In my novel machine the stock of any desired shape in cross section and of indefinite length is restrained from rotation, said stock having only a longitudinal movement which is intermitting and to the proper extent to project the stock beyond the end of a chuck holding it, the end of the stock being presented in succession to a plurality of sets of rotating milling tools, the axes of rotation of the milling tools of different sets being inclined one with relation to the other that the milling tools of one set may act upon different parts of the stock from the milling tools of another set. The milling tools and other actuating mechanism are mounted upon a carriage, and the leading gear of each set of milling tools comes intermittingly into engagement with an actuator which may run constantly. The portion of the article presenting in cross-section a shape other than circular, may be shaped to present different facets located more or less distant from the longitudinal center of the stock, and to provide one way for off-setting from the longitudinal center of the stock the point of the awl, I have, in the embodiment of the invention selected for illustration shown the opening embracing the stock at the end of the chuck as being out of line with relation to the longitudinal center of the chuck and also each throat which guides the stock being acted upon by a pair of milling tools is similarly out of line with relation to the working center of the corresponding milling tools, and by varying the extent of offsetting of said chuck opening and throat it is possible to change without limit the location of the facets of the portions of the article other than round and the location of the point of the awl leaving it in any desired position. These facets may be finished either as plane surfaces or as oval or rounded surfaces by merely changing the shape of the finishing cutters or the cutters last used in the production of the awl or other article.

In the drawings which illustrate one embodiment only of my invention, Fig. 2ᵃ is a section in the line $x$, Fig. 2, showing the first set of milling tools; Fig. 5ᵃ is a detail showing the gears $f^{10}$ and $f^{12}$; Fig. 11ᵃ is an enlarged view of the delivery end of the chuck, showing the eccentricity of the delivery opening somewhat accentuated.

Referring to the drawings, A represents portions of a suitable frame work to sustain the working parts, the lower part of said framework (not shown) being suitably shaped to stand upon the floor or other support. The upper part of the frame sustains a pillow-block $A'$, the latter being secured to the frame by suitable bolts $A^2$. The pillow-block has suitable bearings $A^3$, which receive and hold fixedly a sleeve $A^4$, threaded at its front end at $A^5$, see Fig. 8, and having a flange $a^{4x}$ to receive a nose $A^6$, shown as presenting at its interior a tapered surface $A^7$, which acts to close the chuck $a^2$ to be described, upon the stock. The rear or left hand end, viewing the drawing Figs. 8 and 9, of the sleeve $A^4$, is provided with one or more longitudinal slots $A^8$, and the end of the sleeve is provided with a screw thread $A^9$.

Figures 4, 5, 6, 7:
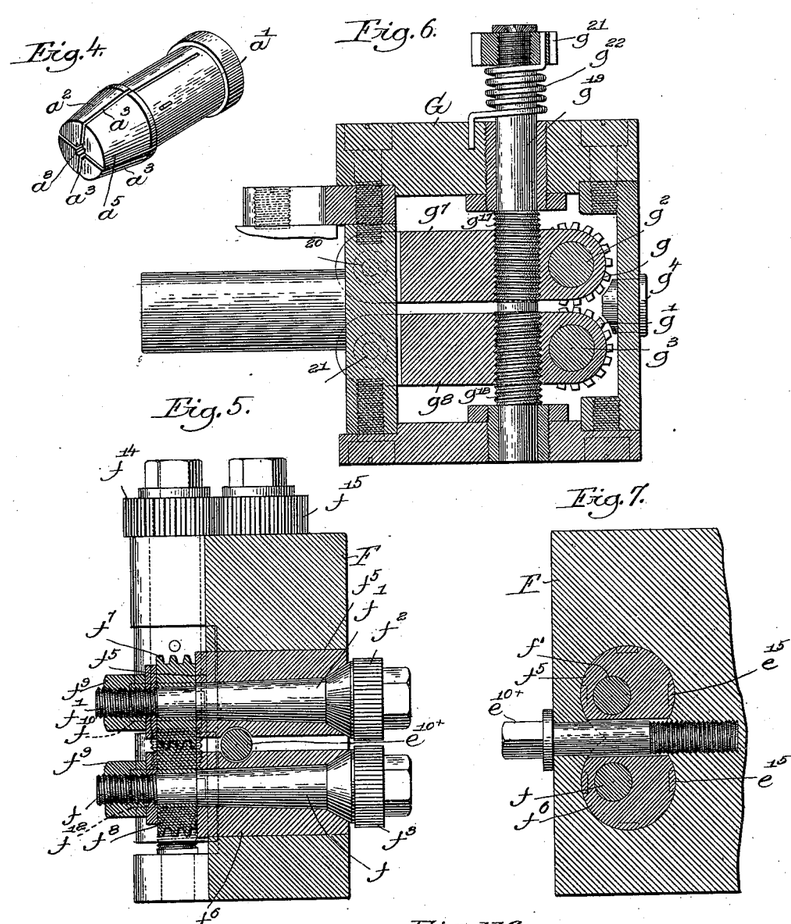
Fig. 4 is an enlarged view of the chuck, showing its stock delivery opening offset.
Fig. 6 is a section on the irregular line $x^3$, Fig. 3, showing on an enlarged scale the final or finishing set of milling tools, and one form of means for determining the taper to be given to the milled face of the article.
Fig. 7 is a sectional detail in the line $x^4$, Fig. 3, chiefly to show the eccentric bearings or bushings for the shafts of the milling tools.
Figure 11:
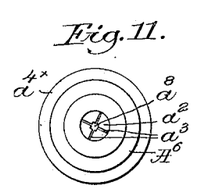
Fig. 11 shows a face view of the chuck enlarged, and the surrounding nose.
Figure 11A:
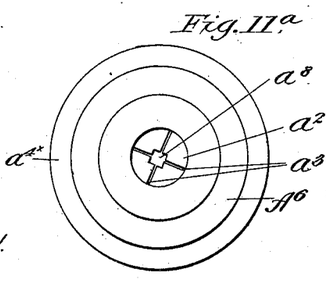

The sleeve $A^4$ receives a chuck operating tube against which abuts the inner end of the chuck $a^2$ represented as detached in Figs. 4 and 11. The outer or head end of the chuck is tapered, as at $a^5$, and the chuck is split longitudinally at $a^3$ to enable the chuck to be closed firmly and grasp or hold the rod or stock being operated upon as the tube is moved to the right, viewing Fig. 8, the tapered part contacting with the inner tapered surface $A^7$ of the nose $A^6$. The tube $a$ has one or more lugs $a^7$ that enter the slots $A^8$ of the sleeve $A^4$ and prevent the rotation of the tube when being slid.

Figures 8, 9:
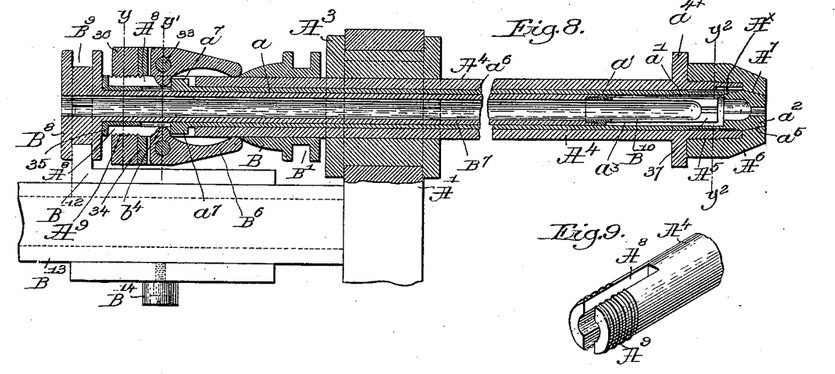
Fig. 8 is a longitudinal section through the sleeve $A^4$ on the dotted line $x'$, Fig. 3, said figure showing the feeding rod, the chuck, and its operating tool.
Fig. 9 shows in perspective the outer slotted end of the sleeve.
Figure 10:
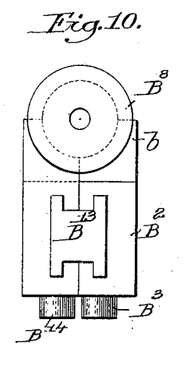
Fig. 10, a left hand end view of the guide $B^{13}$ and studs thereon.

Viewing Figs. 4, 8, 11 and 11$^a$ it will be noticed that the hole or opening $a^8$ in the chuck, through which the stock is delivered, is located at one side the longitudinal axis of the chuck, and the opening is four-sided, as the stock in the present instance of my invention, being acted upon to form an awl, is four-sided, but this invention is not limited to the particular shape shown for the delivery opening of the chuck, as that will be varied according to the cross section of the stock used.

Figure 1:
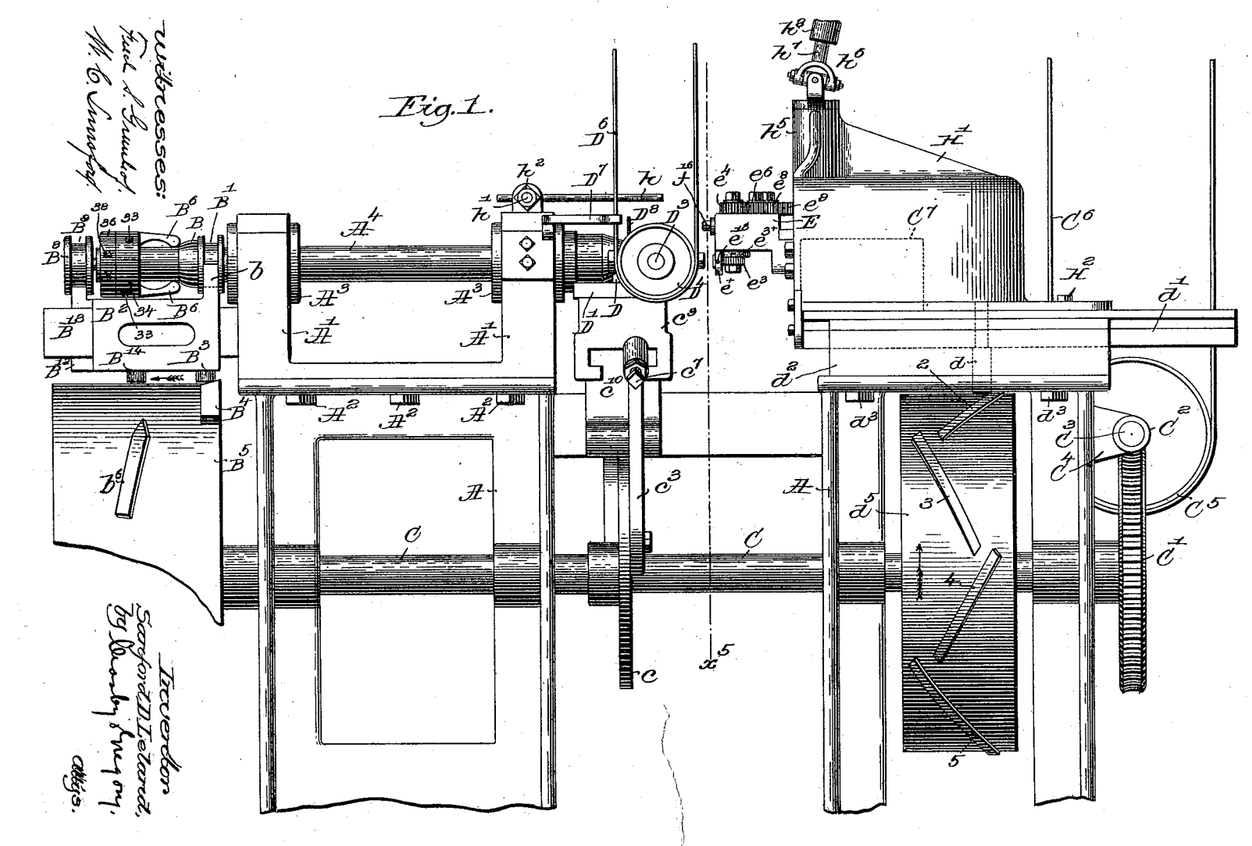
Figure 1 represents in side elevation a sufficient portion of my novel machine to illustrate the location of its operative parts, the cam for actuating the stock, and feeding means for operating the chuck being partially broken off.

To move the tube $a$ at the proper time to close the chuck $a^2$, I have mounted on the sleeve $A^4$ a cone B provided with an annular groove $B'$, in which enters a portion $b$ of a slide $B^2$ having at its underside a stud $B^3$, which at the proper time in the operation of the machine is struck by a cam or projection $B^4$ on the hub $B^5$, such projection moving the slide $B^2$ in the direction of the arrow Fig. 1, causing the cone to act upon the free ends of two like levers $B^6$, and turn said levers so that their shorter arms $b^4$ in contact with the projections $a^7$ of the tube $a$ slides the same longitudinally for a sufficient distance to act upon, slide and close the chuck $a^2$ upon the stock as described. A projection $b^x$ on the hub $B^5$ meets the opposite side of the projection $B^3$ and moves the slide $B^2$ in the opposite direction to thus enable the chuck to release the stock as when the latter is to be fed and its end projected through the opening $a^8$ of the chuck.

Figure 12:
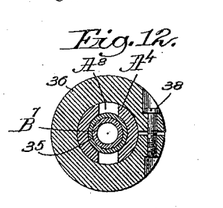
Fig. 12 is a section in the line $y$, Fig 8.
Figure 13:
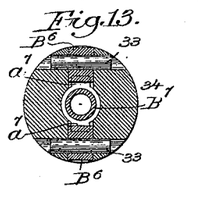
Fig. 13 is a section on the line $y'$ Fig.
Figure 14:
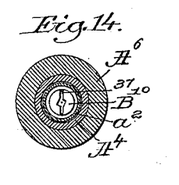
Fig. 14 is a section in the line $y^2$ Fig. 8.

The levers $B^6$ are pivoted at 33 on a collar 34, which is threaded internally, and this collar fits loosely over the split end of the sleeve $A^4$, and thereafter a hollow bushing 35, see Fig. 8, which may have a flange to abut the end of the sleeve $A^4$ is inserted into the open end of said sleeve, and a locking nut, represented as a split ring 36, see Figs. 8 and 12, is screwed upon the threaded part of the sleeve $A^4$, and a suitable clamping screw 38, is inserted through suitable threaded holes of the clamping nut, thus clamping it firmly upon the sleeve, the bushing enabling the split ends of the sleeve to withstand the pressure of the nut.

For feeding the stock intermittently I have provided in this instance of my invention a feeding device, shown partially in section in Fig. 8. The feeding device illustrated consists of a tube $B^7$, having secured or screwed into its inner end, in any suitable manner, a stock engaging device, shown as a piece of steel $B^{10}$, split at 37 to form of it a clamp to engage the stock frictionally with a force sufficient to cause the stock to be moved with it when not restrained by the chuck. That the feeding device may feed the stock through the chuck at the proper times, I have provided one end of the tube $B^7$ with a collar $B^8$, having an annular groove $B^9$ which is entered by a projection from a slide $B^{12}$ free to be moved on a guideway $B^{13}$, said slide having a stud $B^{14}$ which is acted upon by a cam projection $b^3$, Fig. 21, whenever the stock is to be fed through the chuck, the latter being then relaxed, a cam projection $b^6$, Fig. 21, acting on said stud to slide the tube $B^7$ backwardly over the stock, the latter at such time being held firmly by the chuck. The opening at the inner end of the part $B^{10}$ of the tube $B^7$ is shaped in cross-section to correspond with the stock.

The hub $B^5$ is connected with the main shaft C of the machine, sustained in suitable bearings in the framework A, said shaft in the present instance of my invention being provided at one end with a worm toothed gear $C'$, which is engaged by the teeth of a worm $C^2$, on a shaft $C^3$, held in suitable bearings $C^4$ extended from the frame, and said shaft may be provided, as shown, at one end with a suitable belt pulley $C^5$, driven by a suitable belt $C^6$, set in motion from any usual countershaft.

The free end of the stock, having been reduced or milled to the desired shape in cross section, as will be described, the stock must be cut off outside the chuck, and to do this the shaft C is provided with a plate $c$, said plate having at each side suitable cam lugs $c'$, $c^2$, see Fig. 18, which in the rotation of said shaft moves levers $c^3$ and $c^4$, pivoted respectively at $c^5$, $c^6$, on a fixed part $A^×$ of the framework. Each of these levers has an adjustable contact point, as $c^7$ and $c^8$, change of position of which in the lever changes the extent of movement of a carriage $c^9$ mounted, see Fig. 1, upon a suitable way $c^{10}$. The carriage $c^9$ has adjustably connected with it by a bolt D the foot $D'$ of a bearing stand $D^2$, containing a suitable shaft $D^3$, having suitable fast and loose pulleys $D^4$ and $D^5$, driven by a suitable belt $D^6$ under the control of the belt shipper $D^7$, normally occupying a stationary position so that the belt will be maintained upon the loose pulley $D^5$, see Fig. 3, whenever the carriage $c^9$ occupies its inoperative position, but when the carriage is moved in the direction of the arrow thereon, Fig. 3, to cause the cutter $D^8$, represented as a rotating saw, fast on a shaft $D^9$, to cut off the stock, the fast pulley $D^4$ will be brought within the belt $D^6$, and the shaft $D^3$ will be rotated, to thereby cause the cutter to sever the stock. The employment of a rotating cutter enables me to cut off stock which does not rotate.

The shaft $D^9$ is supported in a suitable bearing sustained on the stand $D^2$, said shaft having connected with it a beveled gear $D^{10}$, which is engaged and rotated by a beveled gear $D^{12}$, fast on the shaft $D^3$. When the cam $c'$ acts upon the lever $c^3$, the screw or device $c^7$ meets the end of the carriage $c^9$ and moves it in a direction to cause the cutter to sever the stock, and the stock having been severed, the cutter must be immediately retracted in order that the stock may be fed again through the chuck, and this backward movement of the carriage is effected by the cam $c^2$ acting on the lever $c^4$.

As to the turret $C^7$ which carries the different sets of milling tools to be described it is of usual construction and has a central stud $d$ see Fig. 1 which is made tight in and moves with a carriage $d'$, fitted in a guideway $d^2$, secured to the frame by suitable screws $d^3$, see Fig. 1, and this carriage and its turret is moved toward and from the chuck by or through a series of cams 2, 3, 4, etc., mounted preferably in an adjustable manner upon a hub $d^5$, fast upon the shaft C, said cams meeting in succession one and then the other side of the stud $d$, the carriage being moved forward or to the left viewing Fig. 1, when the milling tools to be described are acting upon the stock, and being moved backwardly when the milling tools are backing off from the stock, the turret being rotated immediately after the milling tools have been backed off the stock, to thus bring the milling tools into operative position in proper succession, said tools being thereafter maintained at rest until again returned into their operative positions.

In practice the worm and worm shaft $C^3$ described will be driven at one speed, viz:— a slow speed while the milling tools are acting to reduce the stock, and at a faster speed when the milling tools are backing off from the stock and the turret $C^7$ is being rotated to bring another set of milling tools into operation. I have not herein shown speed changing means or devices for effecting this difference in speed of rotation of the shaft $C^3$, for the reason that such mechanism is well known and in daily use in connection with machines for automatically threading screws, and in this invention in practice it is intended to employ any of these usual or suitable forms of variable speed contrivances to vary the speed of the shaft C according to the special requirements of the work to increase the amount of work to be done. Inasmuch as said carriage and turret and the means for actuating the same does not herein constitute a portion of my invention, it has not been deemed necessary to specifically illustrate such devices.

The turret $C^7$ is herein represented as provided with four operative sets of devices, said sets being contained in stands E, F, G, H, the stands E, F, G, being secured to the turret by suitable set screws 61, 71, 81, said devices operating for the completion of an awl in the order herein to be described. The stand E carries two like milling tools $e^3$, suitably secured to two upright shafts $e$, $e'$, mounted in like eccentric bearings $e^{3x}$, the milling tools being secured to the lower ends of said shafts, they meeting the end of the stock sustained and guided in a throat $e^x$, held in an ear in the stand by a set screw $e^{13}$.

The upper ends of the shafts $e$ and $e'$ are provided respectively with pinions $e^4$ and $e^5$, the pinion $e^5$ having meshing with it an intermediate gear $e^6$, driven also by an intermediate gear $e^8$ deriving its movement at proper times from a continuously moving actuator shown as a rotating toothed wheel $e^9$, said wheel acting in succession as the driver for the different sets of devices or milling tools to be described.

Figure 15:
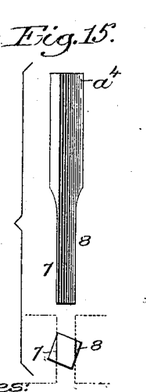
Figs. 15, 16 and 17, show respectively different steps or stages of the stock in the manufacture of an awl, the views being side elevations and end views.

The shape of the hole in the throat plate corresponds with the shape of the stock, and it receives and sustains the stock being reduced by the action of the milling tools $e^3$, they acting to form the cuts 7, 8, on the stock, see Fig. 15, and in the formation of an awl said cuts remove a little more stock at the point 7 than at 8, to thus give to the leading end of the stock faces differing in length, whereas the body of the stock is as a parallelogram presenting equal sides and angles.

Figures 2, 5:
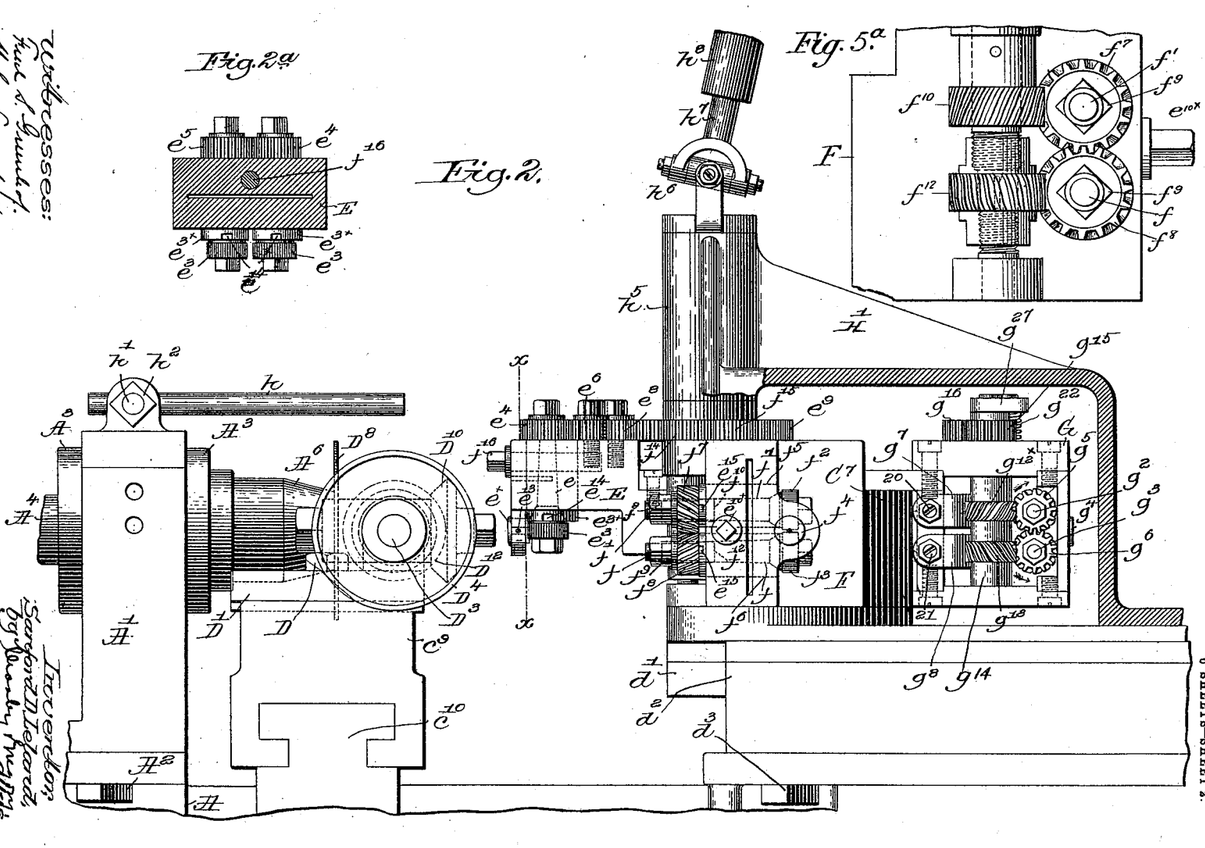
Fig. 2 shows some of the parts represented in Fig. 1, on a larger scale, the hood being in section, most of the sleeve through which the stock is fed being omitted.
Fig. 5 is a section in the line $x^2$, Fig. 3, taken through the second set of milling tools.

The cutters $e^3$ having been operated to reduce the end of the stock at two points by a forward movement of the carriage, the carriage is quickly retracted in any usual manner, and the turret is rotated far enough to bring into operative position the stand F containing the second set of milling tools. The second set of tools is devised to make two other cuts upon the end of the stock, at an angle to the first two cuts, 7, 8, made by the cutters $e^3$, and in order that this may be done and the cuts be made at a suitable angle from stock which does not rotate, I have located the shafts $f$ and $f'$, see Figs. 2, 5, and 7, in a substantially horizontal plane, whereas the shafts $e$ and $e'$ are located in a substantially vertical plane.

Figure 3:
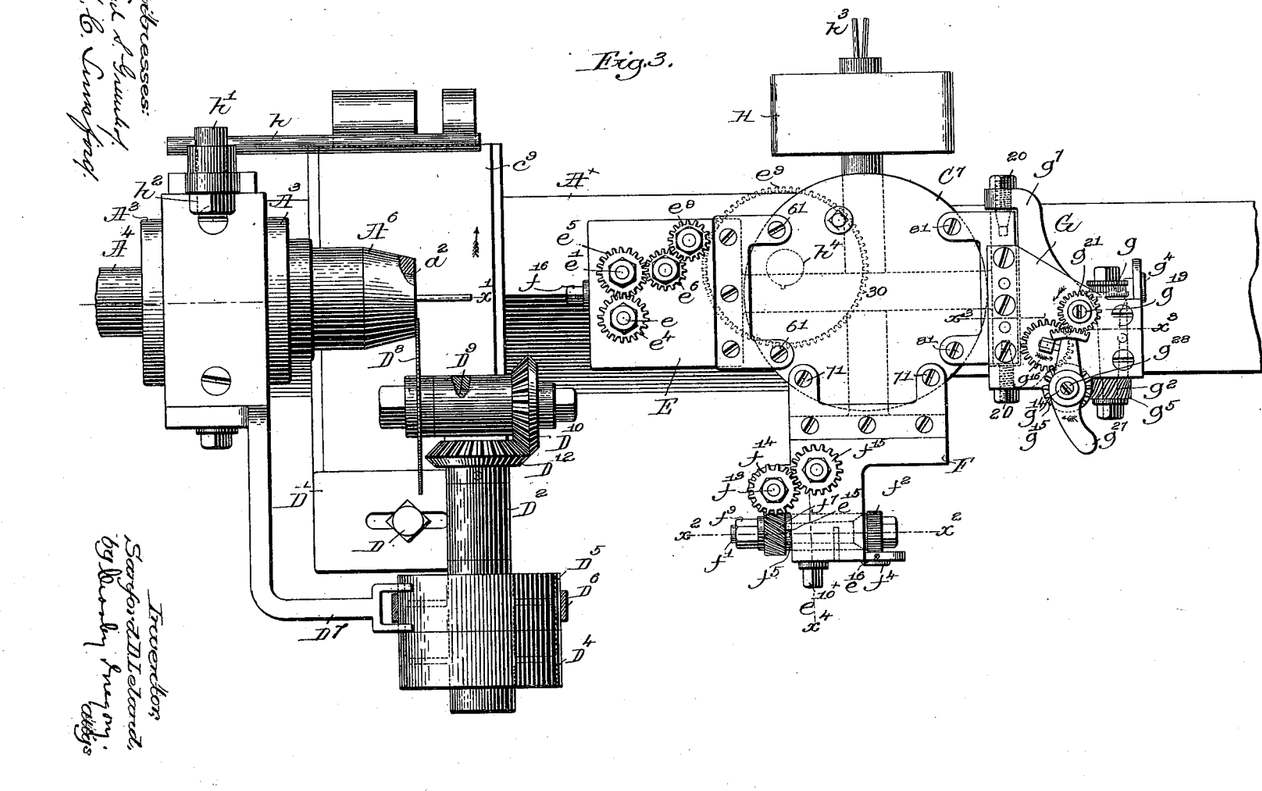
Fig. 3 is a top view of the parts shown in Fig. 2 with the hood omitted, the dotted lines showing the milling tool actuator located, it will be supposed, inside the hood and employed to actuate the milling tools one after the other.

The shafts $f$, $f'$ are provided respectively with milling cutters $f^2$, $f^3$, secured to said shafts in usual manner, the stock entering between said cutters being guided by a throat $f^4$, like the throat $e^x$, said throat being secured in position by a suitable set screw $e^{16}$, see Fig. 3. The shafts $f$, $f'$ are mounted in eccentric bearings $f^5$, $f^6$, which bearings may be turned slightly to adjust the edges of the milling cutters toward or from each other, thereby to space them properly from each other and properly with relation to the center line of the throat $f^4$ to make the required cuts on the stock. The bearings $f^5$, $f^6$, are held in their adjusted position by setting up the set screw $e^{10x}$, which results in clamping the bearings within the stand F.

The eccentric bearings for the shafts $e$, $e'$ are the same as those used for the shafts $f$ and $f'$ and each set of bearings are provided respectively with a plurality of notches $e^{14}$, $e^{15}$, which are exposed outside the stands in order that they may be engaged by a suitable wrench to rotate the bearings more or less according to the separation required for the acting teeth of the milling tools to thereby enable said tools to remove more or less of the stock in making the awl, and by the employment of eccentric bearings, the cutting blades of the said tools may be adjusted with relation to the opening in the throat $e^x$ or $f^4$ to enable each pair of milling tools to remove the desired amount of material from the end of the stock.

The shafts $f$ and $f'$ that they may be rotated are provided at their rear ends with worm toothed gears $f^7$, $f^8$, suitably secured on said shafts by suitable like nuts $f^9$. The worm toothed gears $f^7$ and $f^8$ are engaged respectively by other worm toothed gears $f^{10}$ and $f^{12}$, see dotted lines Figs. 2 and 5, suitably connected with a shaft $f^{13}$, Fig. 3, provided at its upper end with a gear $f^{14}$, engaged and rotated by a toothed gear $f^{15}$, which is engaged and rotated at suitable times by the toothed wheel or actuator $e^9$, said shaft and gears $f^{10}$, $f^{12}$, being counterparts of the shaft $g^{14}$ and gears $g^{12x}$, $g^{13}$, to be described.

Suitable set screws $f^{16}$ and $e^{10x}$ are used to confine the eccentric bearings in their adjusted positions and prevent their rotation.

Figure 16:
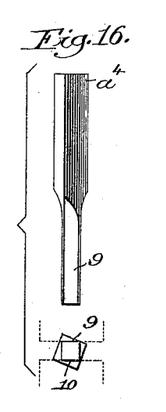

The milling tools $f^2$ and $f^3$ make a second cut in the production of an awl, and they remove portions of the stock at 9, 10, see Fig. 16, the stock removed at 10 leaving a deeper space than the stock removed at 9. At the end of the second cut the leading end of the stock has been reduced into the condition represented in the end view of Fig. 16. The milling tools $f^2$ and $f^3$ having performed their work in a forward movement of the carriage and turret, the carriage is drawn back quickly and the turret rotated, bringing the stand G into operative position, it having milling tools $g$, $g'$, carried by shafts $g^2$, $g^3$, engaging the end of the stock held in the throat $g^4$. The shafts $g^2$ and $g^3$ having each a worm toothed gear, as $g^5$, $g^6$, are mounted in arms $g^7$, $g^8$, pivoted at 20, 21, in the stand G. The gears $g^5$ and $g^6$ are engaged respectively by right and left hand worms $g^{12x}$ and $g^{13}$ on a shaft $g^{14}$. The upper end of the shaft $g^{14}$ has an attached pinion $g^{15}$, which is engaged by a gear $g^{16}$, which is rotated at the proper times by the actuator $e^9$. The arms $g^7$, $g^8$, are provided respectively with right and left hand threads, which are engaged by right and left hand threads $g^{17}$, $g^{18}$, on a shaft $g^{19}$, provided at its upper end with a toothed gear $g^{21}$. The shaft $g^{19}$ is surrounded by a spring $g^{22}$ which acts normally to turn the shaft $g^{19}$ in a direction to cause the arms $g^7$ and $g^8$ to move the milling tools $g$ and $g'$ toward each other. The milling tools $g$ and $g'$ which act upon the end of the stock extended through the throat $g^4$, are shaped to make the final or finishing cut on the awl or other thing being made to give to the leading end of the stock the irregular shape in cross section which is required, say for the production of an awl, said cutters changing the end of the stock from the shape shown in Fig. 16 to the shape shown in Fig. 17, leaving the awl finished with the exception of pointing and smoothing at its edges, which is subsequently done by grinding on a stone.

Figure 17:
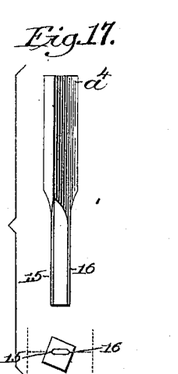

An inspection of Fig. 17 shows the point of the awl offset from the longitudinal center of the stock, and this offsetting is effected in the illustrated embodiment of the invention by placing the delivery opening of the chuck out of center with relation to a line drawn through the center of the feeding device and by placing the center of the operative throat carried by the turret and in which the end of the stock rests while being milled, similarly offset from the working center of its respective pair of milling tools.

It will be seen that in each of the operations described, the cutting means in acting upon opposite sides of the stock to remove different portions thereof defines a space between the inward limits of movement of said cutting means, and that a line drawn through the center of this space would be offset from the longitudinal center of the stock.

That the milling tools $g$ and $g'$ may act to taper the stock, I have provided means for separating automatically said tools as they are being fed onto the end of the stock. For this purpose I have herein shown a sector lever $g^{27}$ pivoted on a stud $g^{28}$ substantially in alinement with the longitudinal axis of the shaft $g^{14}$, the teeth of said sector engaging the pinion $g^{21}$, and that said lever may be moved to rotate the shaft $g^{19}$ positively in a direction to separate the tools $g$ and $g'$ as they are fed on the end of the stock, I have provided an adjustable stop $h$ which is held in clamped position by a suitable clamp $h'$, having a nut $h^2$, the lever meeting the stop and being turned thereby to separate the tools $g$ and $g'$ more or less according to the taper it is desired to give to the blade of the awl. The milling cutters $g$ and $g'$ having reduced the stock into substantially the form of an awl, the carriage with its turret is backed off and the turret is rotated, bringing into position the stand H, provided with a blade holder composed of two prongs $h^3$, separated at a distance apart and having their faces so located as to contact with the two sides 15, 16, of the awl blade, so that the blade will be firmly held and will not be strained or bent while the cutter $D^8$ heretofore described, is moved to contact with the stock substantially close to the end of the chuck to cut off an awl or other thing made by the parts described.

The toothed actuator or gear $e^9$, that it may be operated to rotate the gearing for actuating the different milling cutters described, is mounted upon a shaft $h^4$, held in a suitable bearing $h^5$, in a hood H', which in practice is connected with the carriage $d'$ by means of suitable set screws $H^2$, so that said hood partakes of all the movements of the carriage, and inasmuch as the pinions $e^8$, $f^{15}$, and $g^{16}$, present their teeth in a circle described from the center 30, it follows that the teeth of the gear $e^9$ may engage said gears $e^8$, $f^{15}$, and $g^{16}$, one after another whenever in the rotation of the turret said gears are brought into their respective operative positions.

Figures 18, 19, 20, 21:
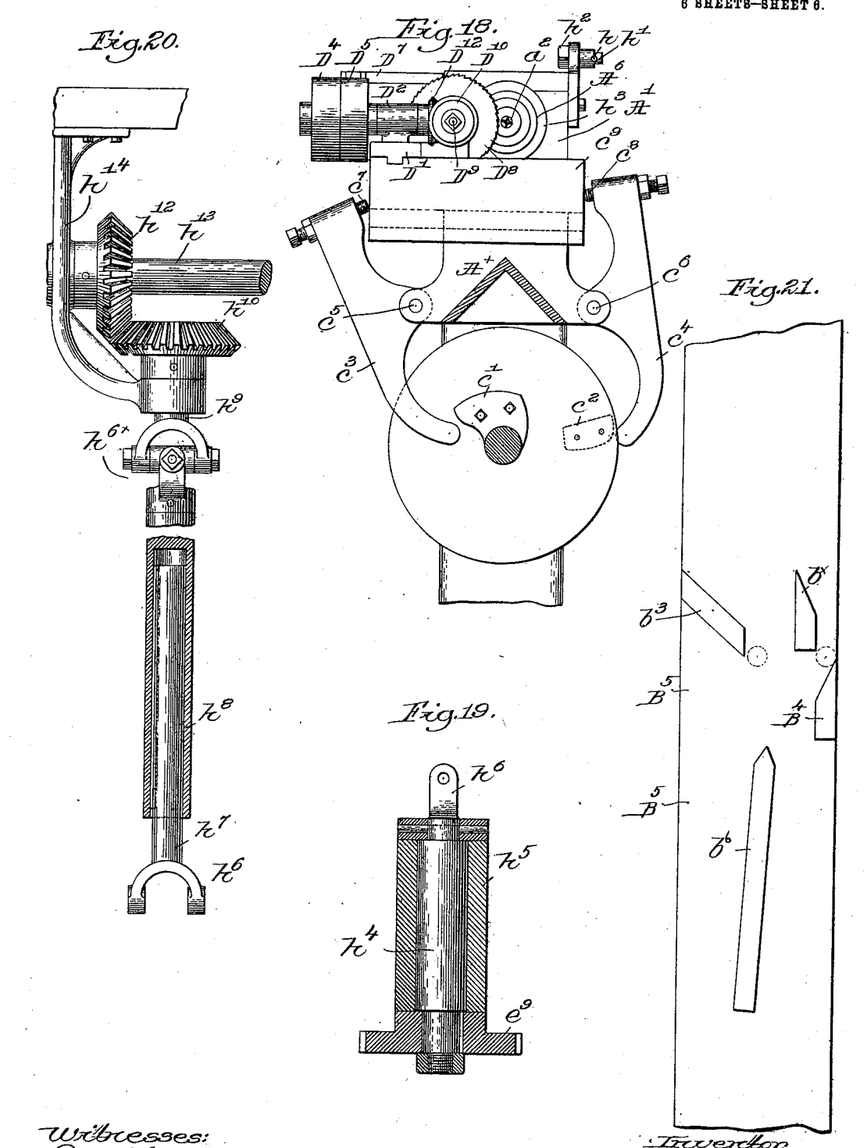
Fig. 18 is a section in the line $x^5$, Fig. 1, looking to the left.
Fig. 19 is a detail showing in section part of the casing and the shaft thereon carrying the actuator $e^9$.
Fig. 20 is a detail showing driving means for the continually moving actuator.
Fig. 21 shows the hub $B^5$ laid out flat to illustrate the projections thereon for moving the slides to be described.

The upper end of the shaft $h^4$ is connected by a suitable ball or universal joint contrivance $h^6$, with a rod $h^7$, which has a sliding fit in a bar $h^8$, in practice connected at its upper end by or through a like ball or universal joint, $h^{6x}$, see Fig. 20, with a short shaft $h^9$, having a beveled gear $h^{10}$, actuated from a suitable beveled gear $h^{12}$ on a line or other shaft $h^{13}$, held in a stand $h^{14}$, substantially at the ceiling, so that said sleeve or rod $h^8$, with which the shank $h^7$ has a sliding but not a rotating fit, may be rotated whatever the position of the carriage, so that said substantially continuously rotating gear $e^9$, constituting an actuator, is always in operation, and will readily start and rotate the milling tools whenever the latter come into their operative positions.

The machine will have operatively connected with it usual oil feeding means, to keep the stock being acted upon well oiled.

Having described my invention, what I claim as new and desire to secure by Letters Patent is:—

1. In a machine of the class described, mechanism to hold the stock to be dressed, cutting means arranged to operate upon opposite sides of said stock, and means for producing a relative movement of the cutting means and stock, the center of the space defined by the inward limits of movement of the cutting means being offset from the longitudinal center of the stock.

2. In a machine of the class described, mechanism to hold and feed stock to be dressed, cutting tools arranged to operate simultaneously upon the opposite sides of the end portion of the stock, and means to cause said tools to move relatively to the stock, the center of the space defined by the inward limits of movement of the tools being offset from the longitudinal center of the stock.

3. In a machine of the class described, mechanism to feed stock to be dressed, a plurality of rotatable tools arranged to act simultaneously upon opposite sides of the stock, means for relatively reciprocating said tools and said stock, and means for so controlling the relative positions of the tools and stock that the center of the space defined by the inward limits of movement of the tools will be offset from the longitudinal center of the stock.

4. In a milling machine, means to embrace and feed a rod, means to clamp and hold said rod stationary that it may be milled, pairs of rotatable milling tools, the tools of each pair being constructed to act simultaneously on opposite sides of the rod, a movable support for the pairs of milling tools, whereby the various pairs of tools may be brought successively into operative position, means for causing relative movement of the support and rod along the rod for the pair of tools to act on it, and automatic means to cause the milling tools of one pair to be separated while acting on the rod to produce a longitudinal taper.

5. In a milling machine, means to clamp and hold a rod stationary while being milled, means to feed the rod longitudinally, a pair of milling tools adapted to act simultaneously on opposite sides of the rod, automatic means to separate the milling tools when in operation, and means to regulate the point at which the separation begins.

6. In a milling machine, means to hold a rod, a pair of rotatable milling tools arranged to act simultaneously on opposite sides of the rod, means for relatively reciprocating the milling tools and the rod, and means to present the rod to the milling tools out of line with their working center, whereby the milled portion of the rod is offset from the longitudinal center of the rod.

7. In a milling machine, a non-rotating rod clamping chuck, a pair of milling tools, a movable support therefor, means for reciprocating the support to cause the tools to act upon opposite sides of the rod to be milled, means coöperating with the clamping chuck during the milling operation to hold said rod out of line with relation to the working center of said pair of tools, whereby facets offset from the original center of the end of the rod will be formed by said milling tools.

8. In a milling machine for making awls, a chuck to feed and hold stock, a turret carrying a plurality of pairs of milling tools arranged to act in succession to form facets on the stock, a throat on the turret for each pair of milling tools in which the stock rests while being milled, said throat and the delivery opening of said chuck being out of line with the working center of the pair of milling tools during the milling operation, whereby the facets formed on the awls will be offset from the longitudinal center of the stock.

9. In a milling machine, a chuck to feed and hold stock, a rotatable cutting-off tool, a carriage therefor, means to move the same transversely of the stock, a shaft supported on said carriage and operatively connected with said tool, fast and loose pulleys on said shaft, a driving belt and a stationary guide for said belt, whereby the cutting-off tool is thrown into and out of operative connection with the driving belt by the movement of the carriage.

10. In a milling machine, means to clamp and hold the stock to be milled, a carriage, automatic means to move the same transversely of the length of the stock, a cutting-off tool rotatably mounted on the carriage, a shaft supported by the carriage and operatively connected with said tool, and driving means for said shaft normally disconnected therefrom, movement of the carriage to put the cutter into its operative position bringing the shaft into driving connection with the driving means, and movement in the opposite direction disconnecting said shaft from the driving means.

11. In a milling machine, a sliding carriage, a shaft sustained therein and provided with a continuously moving actuator comprising a toothed wheel, and a shaft, a substantially universal joint connecting said two shafts, a turret mounted rotatably on said carriage, a plurality of pairs of milling tools carried by said turret and arranged in sets, means to rotate said turret intermittingly to place the first gear of the train of gears for operating each set of milling tools in mesh with said continuously moving actuator whereby each set of milling tools is actuated at the proper times one after the other in a single rotation of the turret.

12. In a milling machine, a chuck to hold stationary the stock to be milled, a rotatable turret, a plurality of pairs of milling tools carried by the turret, gears for rotating the tools of each pair of milling tools in opposite directions, and a continuously rotated gear normally disconnected from the gears for rotating the tools, movement of the turret to bring any pair of milling tools into operative position bringing the gears for said pairs of tools into operative connection with the continuously rotating gear.

In testimony whereof, I have signed my name to this specification, in the presence of two subscribing witnesses.

SANFORD D. LELAND.

Witnesses:
  NELSON W. HOWARD,
  BERTHA L. HANNAH.